(12) United States Patent
Bash et al.

(10) Patent No.: US 11,687,869 B2
(45) Date of Patent: Jun. 27, 2023

(54) SYSTEM AND METHOD FOR SECURING DELIVERY USING AN AUTONOMOUS VEHICLE

(71) Applicant: Flytrex Aviation Ltd., Tel Aviv (IL)

(72) Inventors: Yariv Bash, Tel Aviv (IL); Amit Regev, Tel Aviv (IL)

(73) Assignee: FLYTREX AVIATION LTD., Tel Aviv (IL)

( * ) Notice: Subject to any disclaimer, the term of this patent is extended or adjusted under 35 U.S.C. 154(b) by 942 days.

(21) Appl. No.: 16/029,076

(22) Filed: Jul. 6, 2018

(65) Prior Publication Data

US 2019/0258264 A1 Aug. 22, 2019

Related U.S. Application Data

(60) Provisional application No. 62/633,628, filed on Feb. 22, 2018.

(51) Int. Cl.
  *G05D 1/02* (2020.01)
  *G06Q 10/0833* (2023.01)
  *G06V 20/13* (2022.01)

(52) U.S. Cl.
  CPC ....... *G06Q 10/0833* (2013.01); *G05D 1/0221* (2013.01); *G05D 1/0246* (2013.01);
  (Continued)

(58) Field of Classification Search
  CPC .. G05D 1/0088; G05D 1/0246; G05D 1/0278; G05D 1/0212; G05D 1/0251; G05D 1/0253; G05D 1/0274; G05D 2201/0207; G05D 1/0231; G05D 2201/0216; G01C 21/3602; G01C 21/165; G01C 21/34; G01C 21/3407; G01C 21/3476; G01C 21/3644; G01C 21/3415; G01C 21/28; G01C 21/005; G01C 21/206; G01C 15/04;
  (Continued)

(56) References Cited

U.S. PATENT DOCUMENTS 6,356,196 B1 3/2002 Wong et al.
7,341,186 B2 3/2008 Mrozik et al.
(Continued)

FOREIGN PATENT DOCUMENTS

JP 60169981 A * 9/1985 ......... G06K 7/10871

*Primary Examiner* — Jelani A Smith
*Assistant Examiner* — Paul A Castro
(74) *Attorney, Agent, or Firm* — M&B IP Analysts, LLC

(57) ABSTRACT

A system and method for securing delivery of an autonomous vehicle. The method includes determining visual features of a captured image of a current location of the autonomous vehicle, the captured image generated by an image sensor communicatively coupled with the autonomous vehicle; retrieving location coordinates of the current location of the autonomous vehicle from a positioning sensor communicatively coupled with the autonomous vehicle; matching the visual features of the captured image to reference data associated with the location coordinates; and determining if the current location is the final destination. In some embodiments, the method further includes matching a verification code present within the captured image to a reference verification code, where the verification code is a two-dimensional visual code previously associated with the final destination.

19 Claims, 8 Drawing Sheets

(52) U.S. Cl.
CPC .......... *G05D 1/0278* (2013.01); *G06V 20/13* (2022.01); *G05D 2201/0213* (2013.01)

(58) Field of Classification Search
CPC ............. G01C 21/3841; G08G 5/0069; G08G 5/0013; G08G 5/045; G08G 5/0086; G08G 5/025; G08G 1/205; G08G 5/0047; G06K 9/00664; G06K 9/183; G06K 9/3233; G06K 7/1413; G06K 9/00201; G06T 7/00; G06T 7/73; G06T 7/74; G06T 2207/30204; G06T 7/70; B64C 39/024; B64C 2201/128; B64C 2201/027; B64C 2201/141; B64C 2201/127; B64C 2201/108; B64C 2201/123; B64C 2201/12; B64C 2201/14; B64C 2201/042; B64C 2201/145; B64C 2201/024; B64C 2201/208; B64C 39/02; B64C 2201/165; B64C 27/08; B64C 2201/00; B64C 19/00; B64C 27/00; B64C 27/20; G06Q 10/0832; G06Q 10/0833; G06Q 50/28; G06Q 10/08355; B64D 47/08; B64D 1/02; B64D 1/12; B64D 1/08; B64D 1/00; B64D 9/00; B64D 1/16

See application file for complete search history.

(56) References Cited

U.S. PATENT DOCUMENTS

| | | | |
|---|---|---|---|
| 10,102,758 B1* | 10/2018 | Beaurepaire | G06Q 10/08355 |
| 10,997,544 B1* | 5/2021 | Bar-Zeev | B64F 1/18 |
| 11,086,338 B2* | 8/2021 | Bokeno | B64C 39/024 |
| 2016/0163205 A1* | 6/2016 | Jenkins | G06T 17/05 |
| | | | 701/3 |
| 2018/0053139 A1* | 2/2018 | Stoman | G05D 1/0676 |
| 2018/0107211 A1* | 4/2018 | Schubert | G05D 1/0044 |

* cited by examiner

SYSTEM AND METHOD FOR SECURING DELIVERY USING AN AUTONOMOUS VEHICLE

CROSS-REFERENCE TO RELATED APPLICATIONS

This application claims the benefit of U.S. Provisional Application No. 62/633,628 filed on Feb. 22, 2018, the contents of which are hereby incorporated by reference.

TECHNICAL FIELD

The present disclosure relates generally to securing package delivery, and more specifically, to securing package delivery that uses autonomous vehicles.

BACKGROUND

Unmanned aerial vehicles, or UAVs, commonly known as drones, are increasingly being employed for a variety of uses including aerial photography, military applications, rescue missions, and agriculture monitoring. One increasingly popular application involves the delivery of packages from a sender to a recipient via a drone without the need of an intermediate handling party. Retailers are beginning to employ drone delivery of purchased goods directly from a warehouse to a customer's location, e.g., to their backyard. Drone package delivery allows for faster delivery times, as processing time is reduced, delivery vehicles do not have to wait to be filled to leave a warehouse, and road traffic is avoided entirely.

However, as with many technological advancements, along with their advantages, drones produce new challenges. One concern involves bad actors attempting to steal delivery contents by gaining unauthorized access to a drone (via "hacking"), and rerouting the drone to a new destination, leading not only to theft of merchandise, but increased time and cost toward replacement items and customer support required to respond to such attacks.

It would therefore be advantageous to provide a solution that would decrease the vulnerability to such attacks and overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for securing delivery of an autonomous vehicle, including: determining visual features of a captured image of a current location of the autonomous vehicle, the captured image generated by an image sensor communicatively coupled with the autonomous vehicle; retrieving location coordinates of the current location of the autonomous vehicle from a positioning sensor communicatively coupled with the autonomous vehicle; matching the visual features of the captured image to reference data associated with the location coordinates; and determining if the current location is the final destination.

Certain embodiments disclosed herein also include a non-transitory computer readable medium having stored thereon instructions for causing a processing circuitry to perform a process, the process including: determining visual features of a captured image of a current location of the autonomous vehicle, the captured image generated by an image sensor communicatively coupled with the autonomous vehicle; retrieving location coordinates of the current location of the autonomous vehicle from a positioning sensor communicatively coupled with the autonomous vehicle; matching the visual features of the captured image to reference data associated with the location coordinates; and determining if the current location is the final destination.

Certain embodiments disclosed herein also include a system for securing delivery of an autonomous vehicle, including: a processing circuitry; and a memory, the memory containing instructions that, when executed by the processing circuitry, configure the system to: determine visual features of a captured image of a current location of the autonomous vehicle, the captured image generated by an image sensor communicatively coupled with the autonomous vehicle; retrieve location coordinates of the current location of the autonomous vehicle from a positioning sensor communicatively coupled with the autonomous vehicle; match the visual features of the captured image to reference data associated with the location coordinates; and determine if the current location is the final destination.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
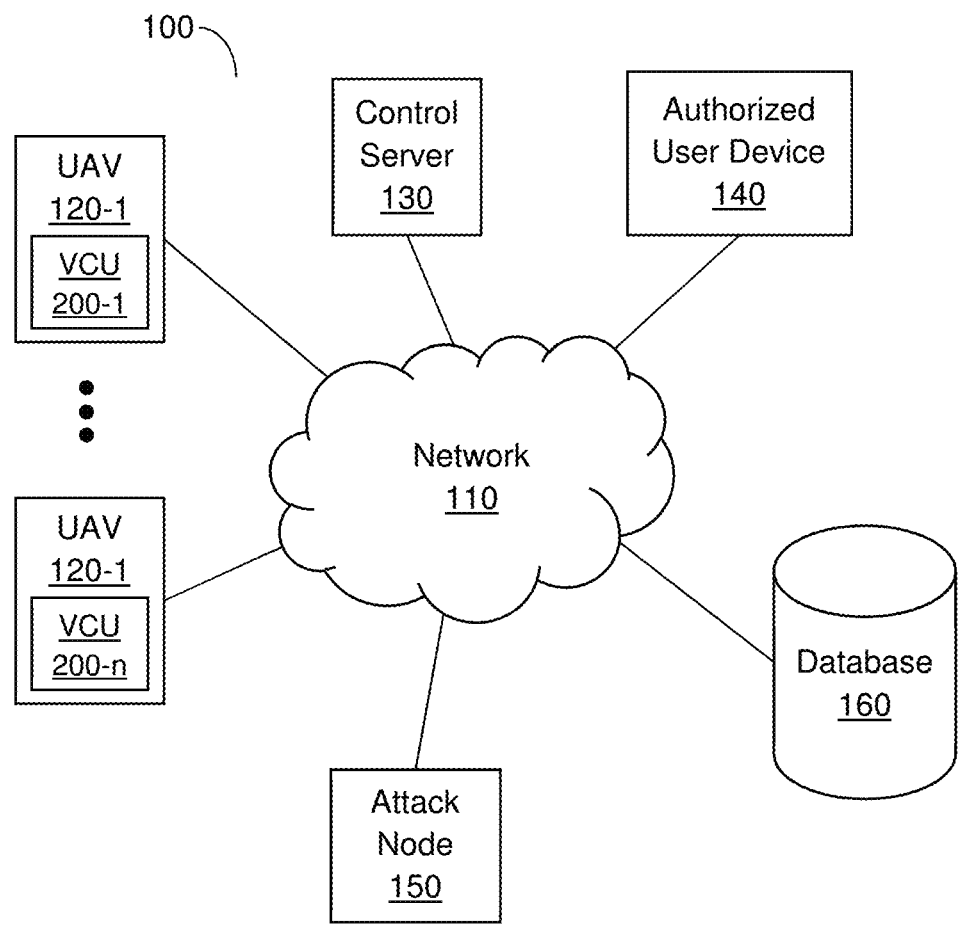
FIG. 1 is a network diagram of a system for securing delivery using an autonomous vehicle according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example network diagram of a system 100 for securing delivery of a payload using an autonomous vehicle, such as an unmanned aerial vehicle, according to an embodiment. An unmanned aerial vehicle (UAV) 120-1 is connected to a control server 130 through a network 110. In an embodiment, one or more UAVs, 120-1 to 120-n, where 'n' is an integer equal to or greater than 1, are connected to the network 110. The UAV (hereinafter referred to individually as a UAV 120 and collectively as UAVs 120, merely for simplicity purposes) 120 is a vehicle configured to deliver a package from an origin location to an intermediate or final destination. It should be noted that while an aerial vehicle is discussed herein, the embodiments disclosed may include any autonomous vehicle, including an autonomous car, truck, boat, and the like. Each UAV 120 includes a vehicle control unit (VCU) 200 configured to control movements of the UAV 120 and to receive instructions from the control server 130, as is further discussed in FIG. 2.

The network 110 may be, but is not limited to, a wireless, cellular, or wired network, a local area network (LAN), a wide area network (WAN), a metro area network (MAN), the Internet, the worldwide web (WWW), similar networks, and any combination thereof.

The control server 130 is configured to send instructions to the UAV 120, e.g., send navigation plans, instruct the UAV 120 what cruising altitude to use during a flight path, instruct the UAV 120 where and when to receive or deliver a payload, and the like. In one embodiment, the control server 130 may be connected to a first UAV 120-1 and to an autonomous truck (not shown), where the control server 130 can instruct the autonomous truck to receive a payload from a warehouse, drive the payload to a distribution center, and deliver the payload to the UAV 120-1, which may be further instructed by the control server 130 to fly the payload to a final destination.

The system 100 further includes a database 160. The database 160 is configured to store therein information associated with a delivery route, including aerial images, maps, predetermined optimal paths, and the like, that may be accessed by the control server 130, the UAV 120 or the authorized user device 140. The database 160 may be changed or updated from time to time.

In an embodiment, an authorized user device 140 is further connected to the network 110, where the authorized user device 140 may be a device of the recipient of the payload or of the delivering entity. The authorized user device 140 is authorized by the control server 130 to send one or more instructions to a UAV 120, via the control server 130, which the control server 130 has preauthorized the authorized user device 140 to send. For example, the authorized user device 140 may include a smartphone of a recipient, which may be configured to schedule preferred delivery times of the payload.

In an embodiment, an attack node 150 is additionally connected to the network 110. The attack node 150 may attempt to redirect the UAV 120, for example, by attempting to send instructions to divert the UAV 120 from a navigation plan provided by the control server 130 to a navigation plan provided by the attack node 150. The attack node 150 may try to navigate the UAV 120 to a location where the payload or the UAV may be stolen. The authorized user device 140 and the attack node 150 may include, for example, a laptop, a desktop, a personal computer, a mobile phone, a smartphone, an internet of things (IoT) device, and the like.

In an embodiment, a visual image of the current location of the UAV 120 is received by the control server 130, e.g., based on an image captured by a camera on the UAV 120, to determine if the current location of the UAV 120 matches the final destination, where the final destination is the location where the UAV 120 is expected to travel to. The determination may include comparing the captured image and a reference image using one or more machine learning techniques, computer vision techniques, artificial intelligence, a combination thereof, and the like. The analysis may further include matching content or metadata from the UAV 120 to similar reference content or metadata, e.g., stored in the database 160, and determining similar characteristics between the UAV 120 data and the reference data.

If it is determined that the current location and the final destination do not match, the UAV 120 may be redirected from the current location to the final destination, to return to the origin location, or to be sent to a third safe location. According to an embodiment, a notification may be generated and sent to a specified device, e.g., to the authorized user device 140.

Figure 2:
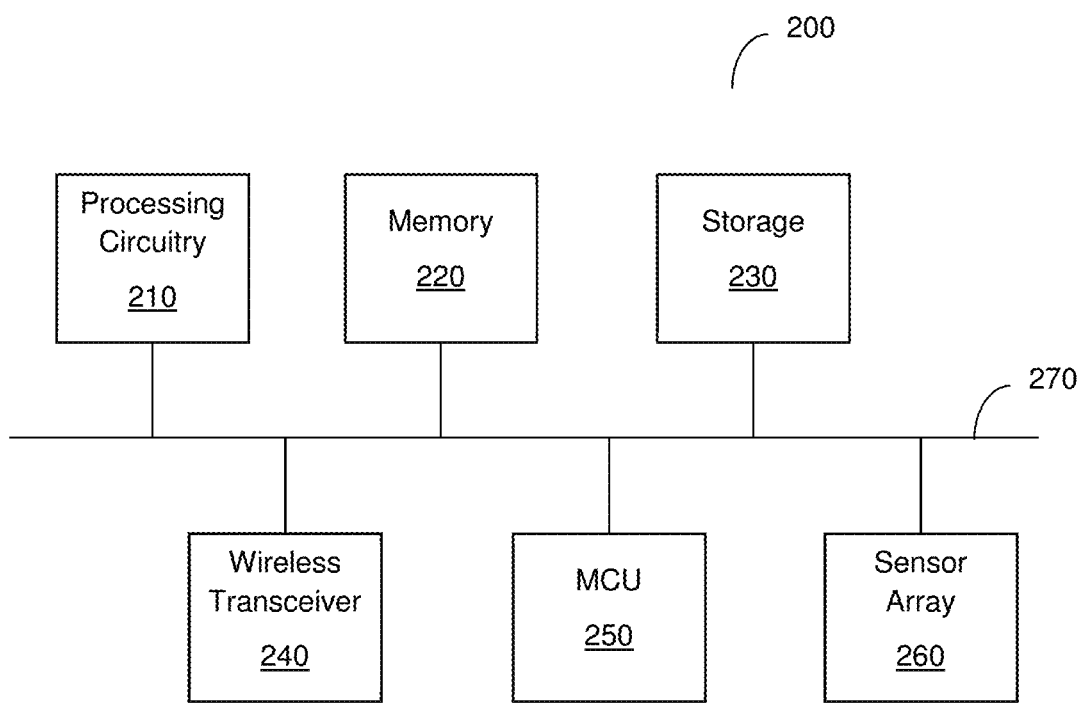
FIG. 2 is a block diagram of a vehicle control unit according to an embodiment.

FIG. 2 is an example block diagram of the vehicle control unit (VCU) 200 according to an embodiment. The VCU 200 includes a processing circuitry 210 coupled to: a memory 220, a storage 230, a wireless transceiver 240, a motor control unit (MCU) 250, and a sensor array 260. In an embodiment, the components of the VCU 200 may be communicatively connected via a bus 270.

The processing circuitry 210 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

In an embodiment, the memory 220 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions cause the processing circuitry 210 to perform the various processes described herein.

The storage 230 may be magnetic storage, optical storage, solid state device, and the like, and may be realized, for example, as flash memory or other memory technology, hard-drives, SSD, or any other medium which can be used to store the desired information. The storage 230 may store delivery routes, navigation plans for the UAV 120, a list of instructions which the delivery vehicle is capable of performing, a list of devices or other identifiers which allow a device to instruct the VCU 200 to configure the vehicle to perform any subset of the list of instructions, one or more digital maps including coordinates, height, and images associated with the coordinates or height, aerial images of an intermediate or a final destination, and the like.

The wireless transceiver 240 is configured to allow the UAV 120 to communicate with the control server 130 and the database 160 of FIG. 1, in order to receive instructions and alerts related to the transportation and delivery of a payload. The wireless transceiver 240 further allows the UAV 120 to communicate over various networks, e.g., to send content, such as images and location coordinates, to the control server 130. In an embodiment, the wireless transceiver 240 is limited to a receiver function, and is configured to receive instructions and data, e.g., maps, from the control server 130 or the database 160 over the network 110 without sending information to the control server 130. In certain embodiments, the wireless transceiver 240 may include a plurality of wireless interfaces. Each wireless interface may correspond to one or more frequencies. A wireless interface may be, for example, WiFi, Bluetooth, LoRA, Sigfox, and the like.

The MCU 250 is connected to the processing circuitry 210 and is configured to control or interface directly with one or more motors (not shown) of the UAV 120. The MCU 240 may operate a combustion engine, electric motor, electric engine, hybrid engine, and the like. Operating an engine includes causing the UAV 120 to fly at a certain altitude, to navigate to a specific destination, to hover, and the like.

The sensor array 260 includes one or more sensors configured to monitor and record the current surroundings and state of the UAV 120. In some embodiments, the sensor array 260 may make use of the memory 220 or the storage 230 to record data generated by the sensor array 260. The sensors may include, but are not limited to, accelerometers, gyroscopes, magnetometers, proximity sensors, image sensors, temperature sensors, positioning systems, and the like. An image sensor may be, for example, a sensor sensitive to visible light, ultraviolet light, infrared light, or multispectral light, or a LIDAR sensor. Based on readings of the sensors from the sensor array 260, the processing circuitry 210 may be configured to redirect the UAV 120 by implementing a new final destination and causing the MCU 250 to change the flight path of the UAV 120.

It should be understood that the embodiments described herein are not limited to the specific architecture illustrated in FIG. 2, and other architectures may be equally used without departing from the scope of the disclosed embodiments.

Figure 3:
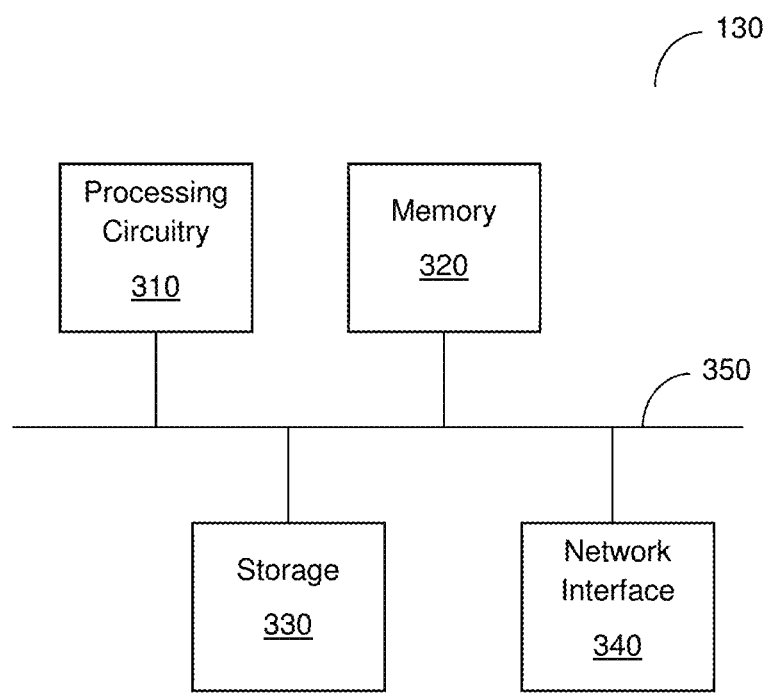
FIG. 3 is a block diagram of a control server according to an embodiment.

FIG. 3 is an example block diagram of the control server 130 according to an embodiment. The control server 130 includes a processing circuitry 310 coupled to a memory 320, a storage 330, and a network interface 340. In an embodiment, the components of the control server 130 may be communicatively connected via a bus 350.

The processing circuitry 310 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

In another embodiment, the memory 320 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions cause the processing circuitry 310 to perform the various processes described herein.

The storage 330 may be magnetic storage, optical storage, and the like, and may be realized, for example, as flash memory or other memory technology, CD-ROM, Digital Versatile Disks (DVDs), hard-drives, SSD, or any other medium which can be used to store the desired information. The storage 330 may store delivery routes; navigation plans for the UAV 120; a list of instructions which the delivery vehicle is capable of performing; a list of devices or other identifiers which allow a device to configure the UAV 120 to perform any subset of the list of instructions; one or more digital maps, including coordinates, height, and images associated with the coordinates or height; aerial images of a final destination; and the like.

The network interface 340 is configured to allow the control server 130 to communicate with the UAV 120 and the database 160, e.g., over the network 110, in order to send instructions and alerts related to the transportation and delivery of a payload. The network interface 340 may include, but is not limited to, a wired interface (e.g., an Ethernet port) or a wireless port (e.g., an 802.11 compliant WiFi card) configured to connect to the network 110. The network interface 340 allows the control server 130 to communicate with the network 110 in order to receive data, e.g., from the sensor array 260 of the UAV 120, and send instructions and content, e.g., updated delivery routes, to the UAV 120.

Figure 4:
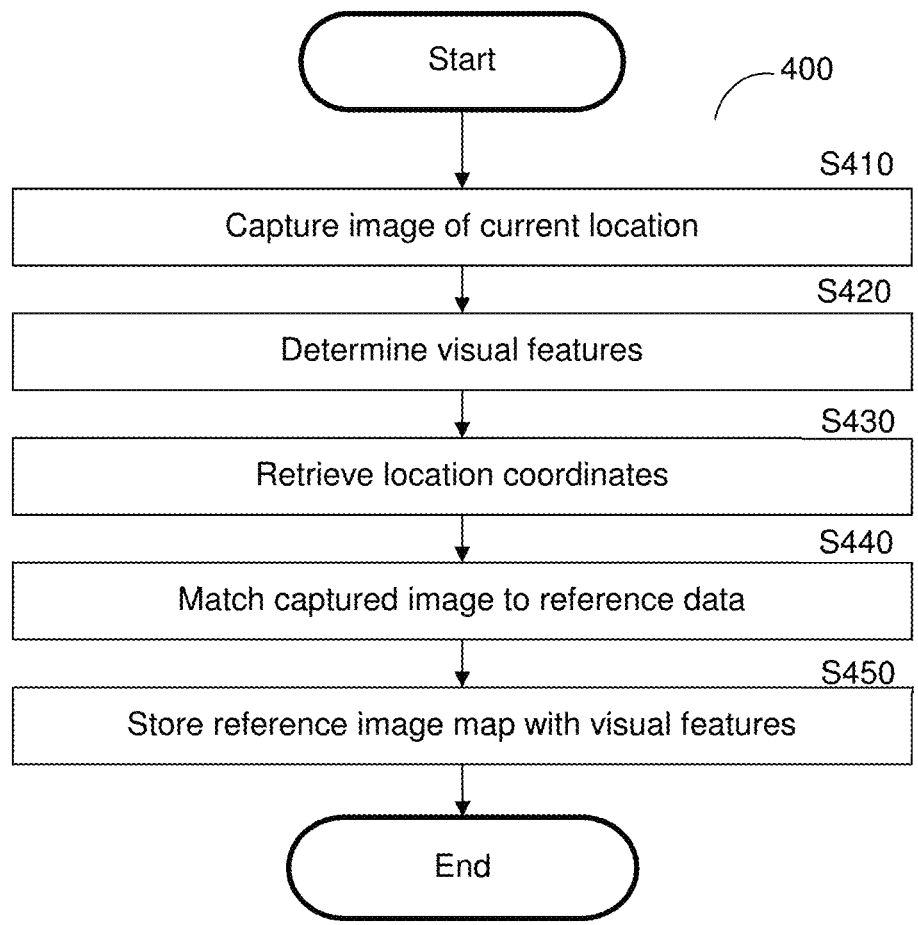
FIG. 4 is a flowchart illustrating a method for generating a reference image map according to an embodiment.

FIG. 4 is an example flowchart illustrating a method 400 for generating a reference image map according to an embodiment.

At S410, an image of a current location of a UAV is captured. In an embodiment, the image is captured from a camera, image sensor, or other appropriate device that is installed within the UAV. The image may be captured based on a specified time, on location coordinates, on a signal received from a remote device, e.g., a control server, and the like. In an embodiment, an image is only captured when it is detected that a UAV is approaching a final destination.

At S420, visual features within the captured image are determined. Visual features include environmental features present within the image, and may include, but are not limited to, man-made structures, natural structures, roadways, vegetation, topography, size and shape of property lots, and the like. Certain items within the image may be deemed to be insignificant, e.g., temporary items such as moving vehicles or pedestrians.

At S430, location coordinates of the current location of the UAV are determined. The location coordinates may be retrieved from a position sensor within the UAV. The positioning sensor may be configured to communicate with a positioning system to determine the location of the UAV, and may include, for example, a global positioning system (GPS), assisted GPS, GLONASS, Galileo, and similar satellite and assisted satellite positioning systems.

At optional S440, the captured image is matched with reference data, such as a stored map, using the location coordinates and the visual features. The reference data may be a map accessed locally from a UAV, or accessed remotely, e.g., from a control server or a database, over a network. In an embodiment, reference data is accessed based on the location coordinates, and the captured image and visual features are compared to the reference data. The matching of the captured image to the reference data may employ various image recognition techniques, machine learning, neural networks, e.g., deep convolutional neural network, and the like.

At S450, if a match is successful, a reference image map is created and stored, e.g., in a database, with reference to the captured image and visual features. In an embodiment, the visual features are stored as metadata associated with a portion of the reference image map. The stored reference image map with the visual features is made accessible for future reference, e.g., by a second UAV accessing the database.

Figure 5:
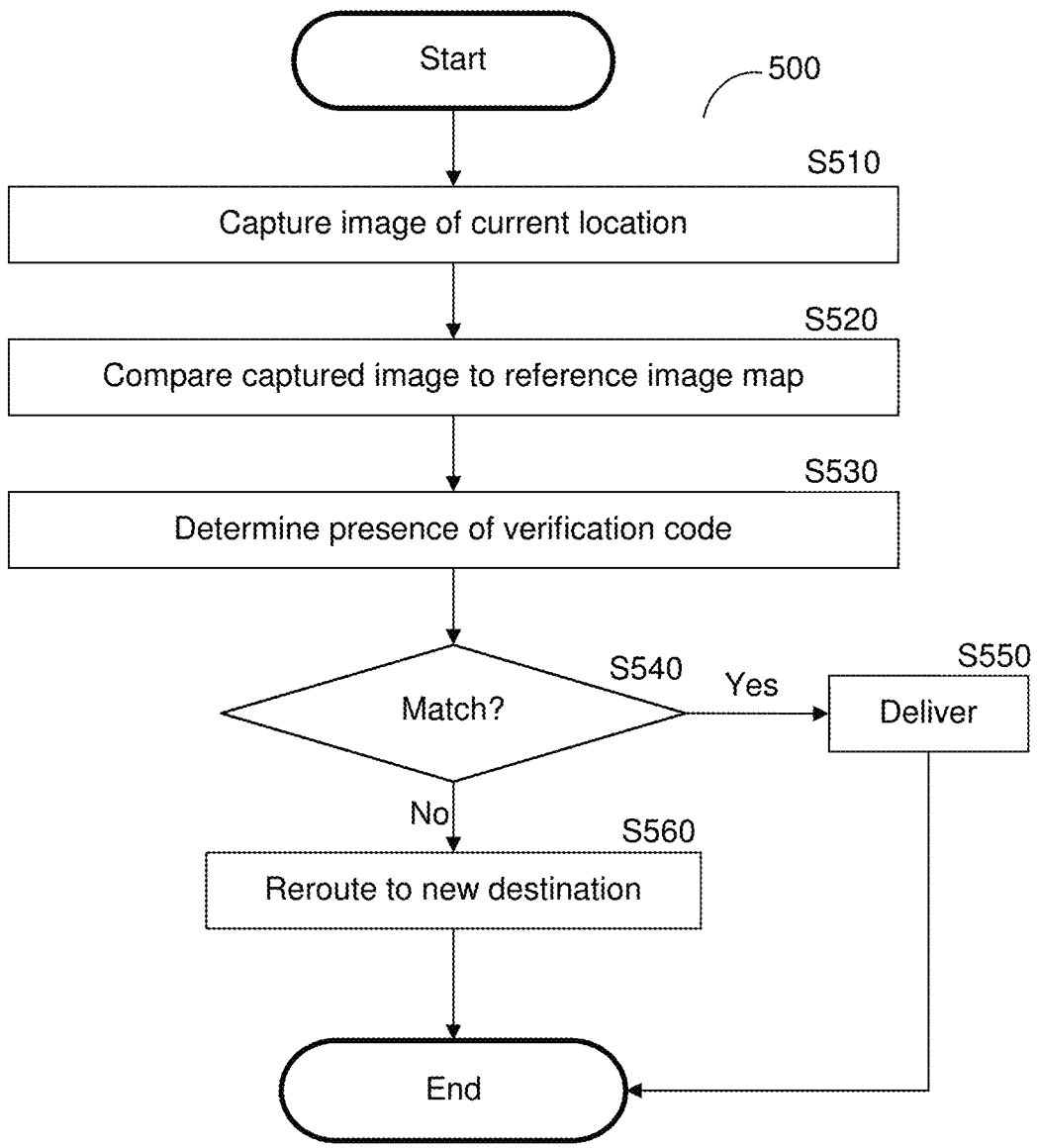
FIG. 5 is a flowchart illustrating a method of verifying a location based on a matched image map according to an embodiment.

FIG. 5 is an example flowchart illustrating a method 500 of verifying a location based on a reference image map according to an embodiment.

At S510, an image of a current location, in which a UAV is present, is captured. In an embodiment, the image is captured from a camera, image sensor, or other appropriate device that is coupled with the UAV. The image may be captured based on an elapsed period of time, on location coordinates, on a signal received from a remote device, e.g., a control server, and the like. In an embodiment, an image is only captured when it is determined that a UAV is approaching a final delivery destination.

At S520, the captured image is compared to a reference image map, where the features of the captured image are compared to features of the reference image map in order to determine if both images depict the same location. In an embodiment, the reference image map is retrieved based on location coordinates, such as GPS coordinates, and matched to the captured image.

At optional S530, in addition to comparing the captured image to the reference matched image map, it is determined if a verification code is present within the captured image. A verification code is a code that may be used to verify that a current location is a final destination. In an embodiment, the verification code includes a two-dimensional barcode, e.g., a QR code, that may be previously associated with a final location. A delivering entity, such as an online vendor, may generate the verification code and share it with a user to be displayed at an expected delivery time. The verification code may be configured to be large enough to be visible from an elevated height, e.g., from an altitude commonly used by a UAV while delivering a payload.

At S540, it is determined if the current location matches the reference image map or the verification code. If so, the current location is determined to be the final destination, and the payload may be delivered at S550. If no match is determined, i.e., if the current location is not determined to be the same as the final destination, a new destination is established. At S560, the UAV is rerouted to the new destination, such as the origin location or to a safe third location, and the execution is terminated.

Figure 6:
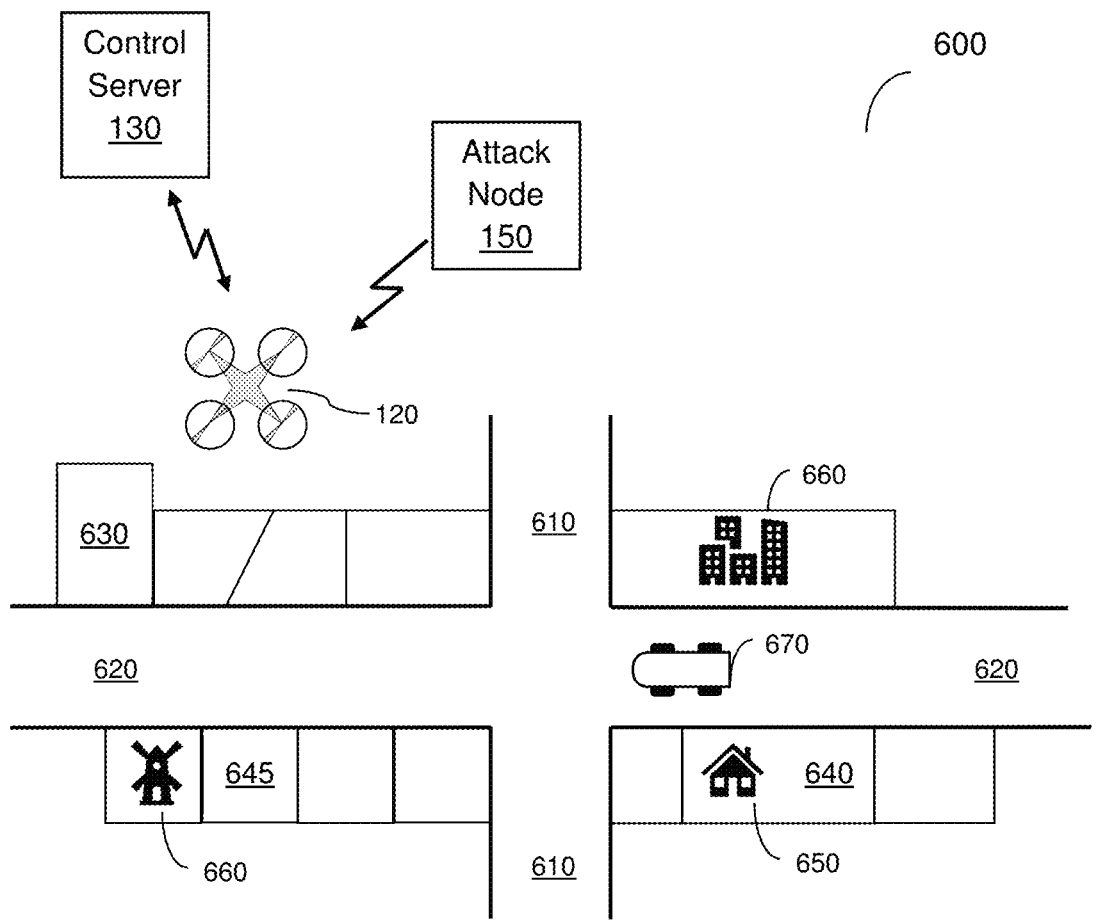
FIG. 6 is a schematic drawing of an example implementation of an attack scenario.

FIG. 6 is a schematic drawing of an example illustration of an attack scenario 600. In the depicted example, a UAV 120 is programmed to deliver a payload from an origin location 630, such as a warehouse, to a final destination 640, such as a user's home. The UAV 120 is instructed from a control server 130 via a wireless connection, e.g., over a wireless cellular network, to fly to the warehouse 630 to retrieve the payload and deliver it to the final destination 630.

The UAV 120 will typically fly over a plurality of lots at a height where at least a portion of the lots are visible to it. In one exemplary embodiment, the UAV 120 may be equipped with a camera that is configured to capture an image of the immediate surroundings, including the landscape below the UAV 120. Additionally, the UAV 120 may include a positioning sensor, such as a GPS receiver, configured to receive signals indicating the position of the UAV 120.

An attack node 150 may attempt to intercept the UAV 120 and cause it to land in a third lot 645. The attack node 150 may employ one or more techniques used for performing the interception. These techniques may include broadcasting instructions to the UAV 120 from the attack node 150 of another device where the intercepting signal is stronger than the operator's signal; spoofing a positioning system signal, such as a GPS signal, to cause the UAV 120 to determine that the third lot 645 is in fact the final destination 630; gaining unauthorized access to the processing circuitry of the UAV 120 to override delivery instructions; and the like.

In countering such a potential attack, the UAV 120 is configured to compare positioning coordinates and captured images of its current surroundings to a reference map associated with the current location to determine if the captured image matches the reference map. In some embodiments, the UAV 120 may authenticate its current location by sending a request to a control server 130 for an image corresponding to the geographic location which the drone is attempting to authenticate. If the image is determined to be a match, the UAV 120 may proceed with the delivery. In some embodiments, the drone 120 may attempt to establish contact with a central server (such as the control server 130 of FIGS. 1 and 3 above) to confirm whether or not to continue with the delivery.

In an embodiment, specific features within a captured image are used when comparing to reference data such as a map. For example, landmarks such as houses 640 within the lot of a final destination 650, buildings 660 placed on adjacent lots, nearby roadway 610 and 620, and the like are used to determine if the delivery path (or destination) of the UAV 120 has been tampered with. Additionally, use of a verification code (not shown), such as a two-dimensional image, may be used and compared with a predetermined association between the verification code and the final destination. Certain objects determined to be insignificant, such as moving vehicles 670 and pedestrians may be flagged as unimportant and ignored in the analysis. If the reference data or the verification code does match the captured image, the delivery continues as planned. If a mismatch is detected, the UAV 120 is directed, via the control server 130, to be rerouted to a new destination, e.g., return to the origin location or navigate to a safe third location, thus avoiding the attack. Alternatively, the UAV 120 may be preprogrammed with one or more 'safe' destinations, and will attempt to land in the nearest safe destination. If the nearest safe destination cannot be verified, a next safe destination may be selected and flown to.

The teachings herein can be used for other purposes, such as ensuring correct navigation for the purpose of performing a more accurate delivery of a payload, without departing from the scope of this disclosure.

Figure 7:
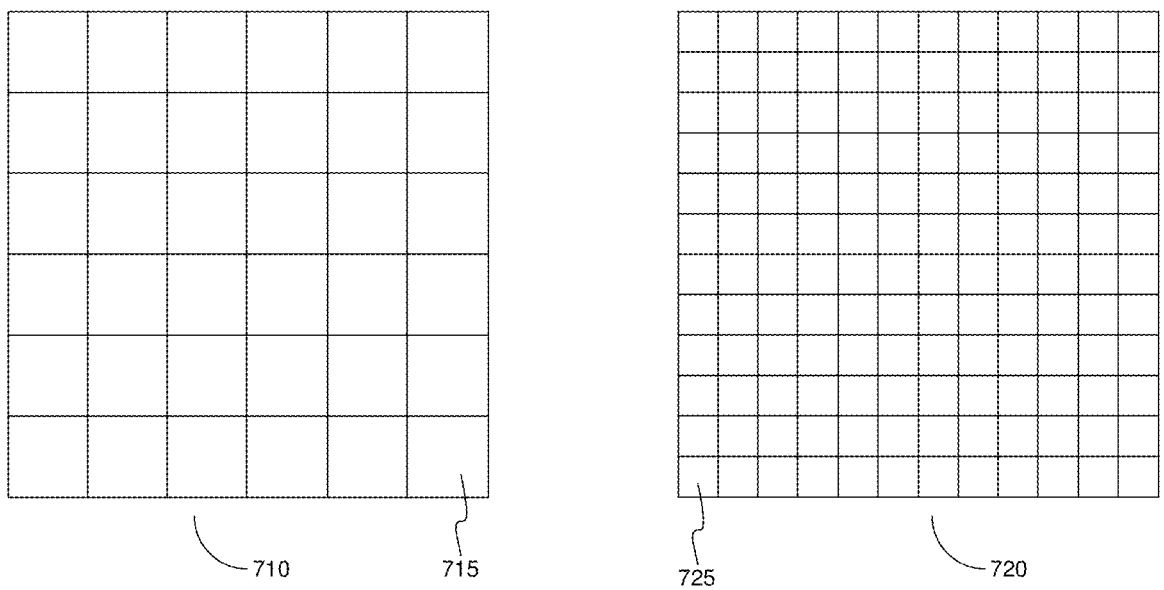
FIG. 7 is a schematic illustration of a pair of two dimensional visual codes according to an embodiment.

FIG. 7 is a schematic illustration of a pair of two dimensional (2D) visual codes 710 and 720 according to an embodiment. A first 2D visual code 710 includes a 6 by 6 array of bits, each bit represented by a square, such as first bit 715. In an embodiment, the squares that are white indicate a value of '0', and the squares that are black indicate a value of '1' (or vice versa). A second 2D visual code 720 includes a 12 by 12 array of bits. When printed, each bit of the second 2D visual code 720 is one quarter the size of a bit of the first 2D visual code 710. For example, when printed, the second bit 725 would be one quarter of the size of the first bit 715. Thus, the second 2D visual code 720 has a higher resolution than the first 2D visual code 710, such that it can store more information therein. However, in order to accurately process a visual code with a higher resolution, an image sensor must be within a certain distance from the visual code to optically distinguish between the smaller bits. Since the range of distances from the visual codes may be restricted, e.g., by a limited range of altitudes for a UAV as defined by government regulations, UAVs must be equipped with sufficiently high-resolution image sensors. In order to accurately read the first 2D visual code 710, it may be possible to use an image sensor with lower a resolution, which may also be more cost effective as compared to implementing the second 2D visual code 720.

Figure 8:
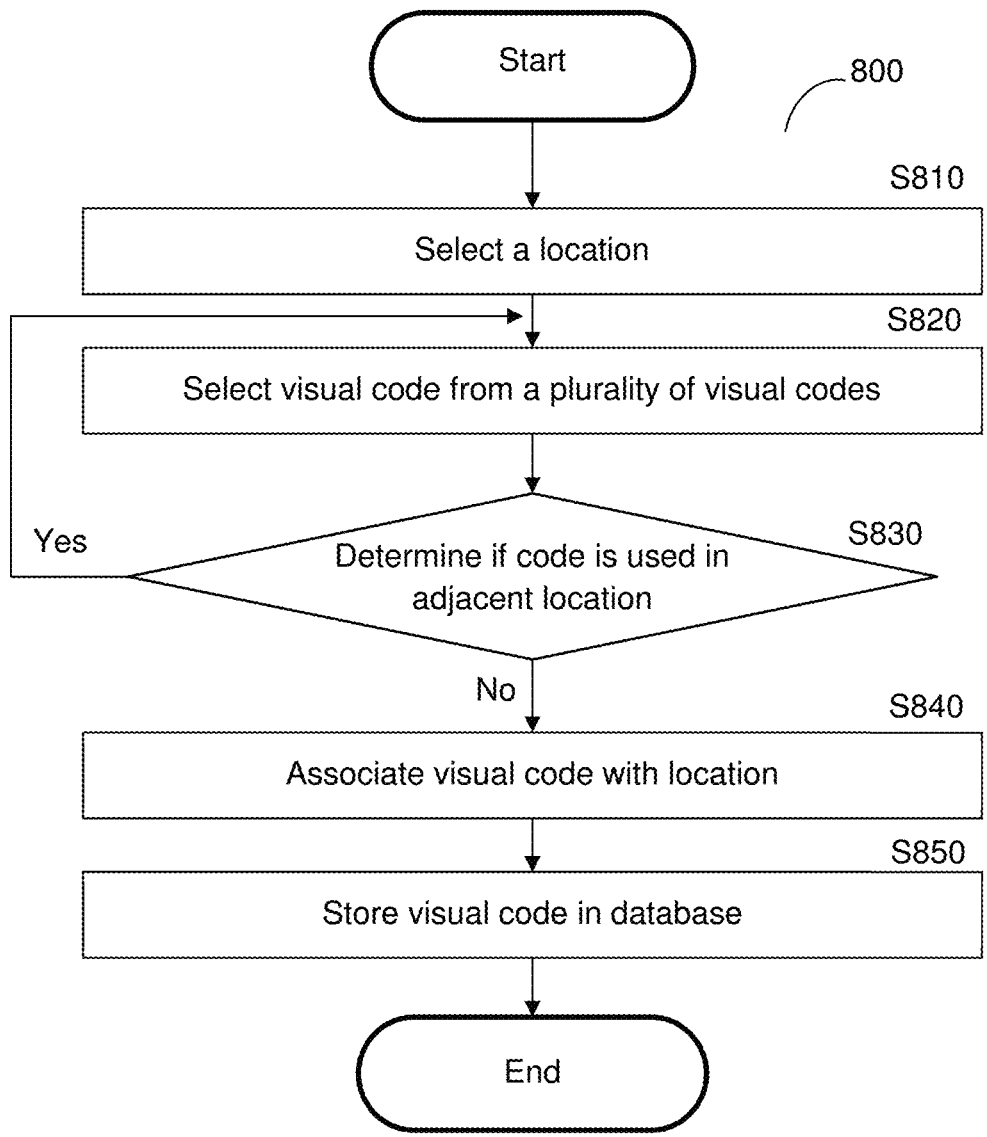
FIG. 8 is a flowchart illustrating a method of associating a visual code with a specific location according to an embodiment.

FIG. 8 is a flowchart illustrating a method 800 of associating a visual code with a specific location according to an embodiment. In an exemplary application, a delivery company may find it beneficial to provide a user with a visual code to be presented to a UAV adapted to deliver a package to employ a two-factor authentication of a location (e.g., the visual code and coordinates of a delivery address). The delivery company may supply the user with a two-dimensional visual code printed on a sheet of paper or reusable plastic sheet large enough such that when placed on the ground, it would be visible to a delivery UAV. This method provides additional security for the package, since the delivery company provides the visual code directly to the user. The UAV is configured to combine the visual code with coordinates associated with a delivery address on record, thus securing the delivery. If the visual code does not match the records, the UAV may be configured to alert the control server, which in turn can, for example, verify through a user device that the package should indeed be delivered. In one embodiment, a control server may send an authorized user device a request to visually confirm that the UAV is present. If the user device does not send a confirmation within a predetermined amount of time, the control server may instruct the UAV to return to an origin or a third location with the package, thereby avoiding a potential loss of property.

In order to supply users with unique codes, a code generator must generate sufficiently large codes. Large amounts of unique codes require high resolution visual codes to allow for larger amounts of information to be displayed therein. Thus, the more unique visual codes required, the larger each code must be in order for a UAV at a given height to be able to accurately resolve the visual code. However, if a method is employed to ensure that a visual code is not reused within a predetermined radius of a delivery location, the amount of information, and thus the required size of the visual code, is reduced.

At S810, a location is selected from a digital map. The location may include geographical coordinates, a street address, and the like, and may be associated with a delivery location or user address.

At S820, a visual code is selected from a plurality of visual codes. The plurality of visual codes may be generated according to the geographical area. A control server may determine the amount of visual codes to be generated. The amount of visual codes may be determined, for example, based on the size of property lots, the amount of lots visible to an image sensor of a UAV from a predefined height, the resolution of the positioning system, and the like. For example, if the UAV is delivering a package to a location where there are 10-20 houses on each block, the control server may generate 20 visual codes to be used such that they are recycled each block, while ensuring that no two houses on the same block are assigned the same visual code.

At S830, a check is performed to determine if the selected visual code is used in an adjacent location. The control server may define the value of 'adjacent' according to a user input. For example, adjacent may be defined as immediate proximity (i.e., two properties that share a border), or as any property within a certain radius (e.g., within a 5 mile radius). If it is determined that an adjacent property does contain the selected visual code, execution continues at S820, otherwise execution continues at S840.

At S840, the visual code is associated with the location. At optional S850, the visual code and the location may be stored on a storage of the control server. In an embodiment, the storage may include a database. Each location may include a single visual code; however, in an embodiment a single location may have multiple visual codes, such that each visual code is further associated with a unique user account.

It should be noted that the disclosed method can be modified for a ground-based vehicle, where the visual code may be placed on the side of a building, a fence, a tree, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for securing delivery of an autonomous vehicle to a final destination, comprising:
 receiving location coordinates of a final destination to navigate to;
 determining visual features of a captured image of a current location of the autonomous vehicle, the captured image generated by an image sensor communicatively coupled with the autonomous vehicle, wherein the visual features are a subset of environmental features within the captured image;
retrieving location coordinates of the current location of the autonomous vehicle from a positioning sensor communicatively coupled with the autonomous vehicle;
matching the location coordinates of the final destination and the current location;
matching the visual features of the captured image of the current location to reference visual features of a reference image associated with the location coordinates of the current location, wherein reference image data includes a map associated with the location coordinates, wherein the map includes a plurality of sub-sections and a plurality of the reference visual features, wherein each reference visual feature is a subset of environmental features in the respective reference image and is stored as metadata in the map associated with a respective sub-section of the map;
matching a verification code present within the captured image to a reference verification code, where the verification code is a two-dimensional visual code previously associated with the final destination;
determining if the current location is the final destination based on the matching between the visual features of the captured image with the reference image; and
rerouting the autonomous vehicle from the current location to a new destination when the current location is determined to be different than the final destination, wherein the final destination is a first final destination, wherein the two-dimensional visual code associated with the first final destination is recycled at a second final destination such that the recycled two-dimensional code is assigned to the second final destination.

2. The method of claim 1, further comprising:
associating the two-dimensional visual code with a final location based on usage of secondary visual codes associated with adjacent properties.

3. The method of claim 2, wherein adjacent properties include at least one of: properties in immediate proximity to the final location and properties within a predetermined radius from the final location.

4. The method of claim 1, wherein the environmental features include at least one of: man-made structures, natural structures, roadways, vegetation, topography, and the size and shape of property lots.

5. The method of claim 1, wherein the reference image data includes at least one previously captured image associated with the location coordinates.

6. The method of claim 1, wherein the location coordinates include satellite positioning coordinates retrieved from the positioning sensor within the autonomous vehicle.

7. The method of claim 1, wherein the matching of the visual features of the captured image to the reference image data includes at least one of: image recognition techniques, machine learning, neural networks, and deep convolutional neural network.

8. A non-transitory computer readable medium having stored thereon instructions for causing a processing circuitry to perform a process, the process comprising:
receiving location coordinates of a final destination to navigate to;
determining visual features of a captured image of a current location of the autonomous vehicle, the captured image generated by an image sensor communicatively coupled with the autonomous vehicle, wherein the visual features are a subset of environmental features within the captured image;
retrieving location coordinates of the current location of the autonomous vehicle from a positioning sensor communicatively coupled with the autonomous vehicle;
matching the location coordinates of the final destination and the current location;
matching the visual features of the captured image of the current location to reference visual features of a reference image associated with the location coordinates of the current location, wherein reference image data includes a map associated with the location coordinates, wherein the map includes a plurality of sub-sections and a plurality of the reference visual features, wherein each reference visual feature is a subset of environmental features in the respective reference image and is stored as metadata in the map associated with a respective sub-section of the map;
matching a verification code present within the captured image to a reference verification code, where the verification code is a two-dimensional visual code previously associated with the final destination;
determining if the current location is the final destination based on the matching between the visual features of the captured image with the reference image; and
rerouting the autonomous vehicle from the current location to a new destination when the current location is determined to be different than the final destination, wherein the final destination is a first final destination, wherein the two-dimensional visual code associated with the first final destination is recycled at a second final destination such that the recycled two-dimensional code is assigned to the second final destination.

9. A system for securing delivery of an autonomous vehicle, comprising:
a processing circuitry; and
a memory, the memory containing instructions that, when executed by the processing circuitry, configure the system to:
receive location coordinates of a final destination to navigate to;
determine visual features of a captured image of a current location of the autonomous vehicle, the captured image generated by an image sensor communicatively coupled with the autonomous vehicle, wherein the visual features are a subset of environmental features within the captured image;
retrieve location coordinates of the current location of the autonomous vehicle from a positioning sensor communicatively coupled with the autonomous vehicle;
match the location coordinates of the final destination and the current location;
match the visual features of the captured image of the current location to reference visual features of a reference image associated with the location coordinates of the current location, wherein reference image data includes a map associated with the location coordinates, wherein the map includes a plurality of sub-sections and a plurality of the reference visual features, wherein each reference visual feature is a subset of environmental features in the respective reference image and is stored as metadata in the map associated with a respective sub-section of the map;
match a verification code present within the captured image to a reference verification code, where the verification code is a two-dimensional visual code previously associated with the final destination;

determine if the current location is the final destination based on the matching between the visual features of the captured image with the reference image; and reroute the autonomous vehicle from the current location to a new destination when the current location is determined to be different than the final destination, wherein the final destination is a first final destination, wherein the two-dimensional visual code associated with the first final destination is recycled at a second final destination such that the recycled two-dimensional code is assigned to the second final destination.

10. The system of claim 9, wherein the system is further configured to:

associate the two-dimensional visual code with a final location based on usage of secondary visual codes associated with adjacent properties.

11. The system of claim 10, wherein adjacent properties include at least one of: properties in immediate proximity to the final location and properties within a predetermined radius from the final location.

12. The system of claim 9, wherein the environmental features include at least one of: man-made structures, natural structures, roadways, vegetation, topography, and the size and shape of property lots.

13. The system of claim 9, wherein the reference image data includes at least one previously captured image associated with the location coordinates.

14. The system of claim 9, wherein the location coordinates include satellite positioning coordinates retrieved from the position sensor within the autonomous vehicle.

15. The system of claim 9, wherein the match of the visual features of the captured image to the reference image data includes at least one of: image recognition techniques, machine learning, neural networks, and deep convolutional neural network.

16. The method of claim 1, further comprising:

causing the autonomous vehicle to deliver a payload when the current location is determined to be the final destination.

17. The system of claim 9, wherein the system is further configured to:

cause the autonomous vehicle to deliver a payload when the current location is determined to be the final destination.

18. The method of claim 1, wherein matching the visual features of the captured image of the current location to the reference visual features of the reference image associated with the location coordinates of the current location, further comprises:

comparing a subset of the visual features of the captured image to the reference image.

19. The system of claim 9, wherein the system is further configured to:

compare a subset of the visual features of the captured image to the reference image.

* * * * *